US012566345B2

(12) United States Patent
Chen et al.

(10) Patent No.: US 12,566,345 B2
(45) Date of Patent: Mar. 3, 2026

(54) DISPLAY APPARATUS AND ELECTRONIC DEVICE

(71) Applicant: HUIZHOU TCL MOBILE COMMUNICATION CO., LTD., Huizhou (CN)

(72) Inventors: Ping Chen, Huizhou (CN); Zhuwei Qiu, Huizhou (CN); Ke Lin, Huizhou (CN); Yang Yu, Huizhou (CN); Jitao Ma, Huizhou (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/719,250

(22) PCT Filed: Nov. 11, 2022

(86) PCT No.: PCT/CN2022/131503
    § 371 (c)(1),
    (2) Date: Jun. 12, 2024

(87) PCT Pub. No.: WO2023/109388
    PCT Pub. Date: Jun. 22, 2023

(65) Prior Publication Data
    US 2025/0130455 A1      Apr. 24, 2025

(30) Foreign Application Priority Data
    Dec. 15, 2021    (CN) .......................... 202111533121.9

(51) Int. Cl.
    *G02F 1/1333*        (2006.01)
    *G02F 1/1335*        (2006.01)

(52) U.S. Cl.
    CPC .... *G02F 1/13338* (2013.01); *G02F 1/133502* (2013.01); *G02F 1/133514* (2013.01); *G02F 2202/28* (2013.01)

(58) Field of Classification Search
    CPC ............... G02F 1/13338; G02F 1/1335; G02F 1/133502
    See application file for complete search history.

(56) References Cited

U.S. PATENT DOCUMENTS

2015/0138452 A1      5/2015   Petcavich

FOREIGN PATENT DOCUMENTS

CN          204143409  U       2/2015
CN          204480200  U       7/2015
            (Continued)

OTHER PUBLICATIONS

International Search Report in International application No. PCT/CN2022/131503, mailed on Feb. 17, 2023.
(Continued)

*Primary Examiner* — Joseph L Williams
(74) *Attorney, Agent, or Firm* — PV IP PC; Wei Te Chung

(57)          ABSTRACT

A display apparatus (2) and an electronic device (0). The display apparatus (2) comprises a first functional layer (211) of a touch screen (21), a touch sensing layer (212) of the touch screen (21), a second functional layer (223) of a display screen (22), a liquid crystal panel (221) of the display screen (22), a third functional layer (224) of the display screen (22), and a backlight module (222) of the display screen (22), which are arranged in a stacked manner, wherein the touch screen (21) is bonded with the display screen (22), and at least two of the first functional layer (211), the touch sensing layer (212), an adhesive (23), the second functional layer (223) and the third functional layer
(Continued)

(224) are provided with an anti-glare structure and/or a blue light blocking structure.

16 Claims, 3 Drawing Sheets

(56)                    References Cited

FOREIGN PATENT DOCUMENTS

| CN | 204650472 U | 9/2015 |
|----|-------------|--------|
| CN | 105260056 A | 1/2016 |
| CN | 204964945 U | 1/2016 |
| CN | 205656598 U | 10/2016 |
| CN | 206649854 U | 11/2017 |
| CN | 207965843 U | 10/2018 |
| CN | 109343164 A | 2/2019 |
| CN | 208569606 U | 3/2019 |
| CN | 211044224 U | 7/2020 |
| CN | 211847789 U | 11/2020 |
| CN | 212051209 U | 12/2020 |
| CN | 212540958 U | 2/2021 |
| CN | 212966134 U | 4/2021 |
| CN | 112925449 A | 6/2021 |
| CN | 214375721 U | 10/2021 |
| CN | 214847521 U | 11/2021 |
| CN | 113791505 A | 12/2021 |
| CN | 114217470 A | 3/2022 |
| JP | 3189775 U | 4/2014 |

OTHER PUBLICATIONS

Written Opinion of the International Search Authority in International application No. PCT/CN2022/131503,mailed on Feb. 10, 2023.

Chinese Office Action issued in corresponding Chinese Patent Application No. 202111533121.9 dated Oct. 16, 2023, pp. 1-9.

European Office Action issued in corresponding European Patent Application No. 22906140.3 dated Oct. 24, 2025, pp. 1-9.

DISPLAY APPARATUS AND ELECTRONIC DEVICE

CROSS REFERENCE TO RELATED APPLICATIONS

This Application is a US national phase application based upon an International Application No. PCT/CN2022/131503, filed on Nov. 11, 2022, titled "DISPLAY APPARATUS AND ELECTRONIC DEVICE", which claims priority of China Patent Application entitled "DISPLAY APPARATUS AND ELECTRONIC DEVICE", application Ser. No. 202111533121.9, filed Dec. 15, 2021, the entirety of which is incorporated by reference herein.

TECHNICAL FIELD

This application relates to the field of display device technology, and particularly, to a display apparatus and an electronic device.

BACKGROUND ART

As communication interfaces between users and information, liquid crystal displays have become the current mainstream display manner due to their superior characteristics such as high space utilization, low electromagnetic interference, and no radiation. The liquid crystal displays are widely used in information communication tools such as TVs, smartphones, and tablets.

At present, with the continuous advancement of science and technology, more and more electronic products with liquid crystal displays have entered people's lives. As a medium for human-computer interaction, liquid crystal displays are an essential part of these electronic products. The text or images displayed on the liquid crystal displays are composed of three primary colors which are combined with different energies. The blue light component (in a 430-440 nm wavelength range) of the three primary colors has a greater destructive effect on the macular areas of the human eyes. Over time, the human eyes will be damaged from looking at screens for long periods of time. Although anti-blue light protective films have appeared on the market, the existing protective films generally have a single function and can only prevent blue light from harming human eyes to a certain extent. They do not have other protective functions such as anti-glare and cannot satisfy users' requirements.

Therefore, it is necessary to provide a new display apparatus and electronic device to solve the above technical problems.

SUMMARY OF INVENTION

Technical Problem

Embodiments of the present application provide a display apparatus and an electronic device to improve anti-glare and anti-blue light functions of the display apparatus of the electronic device during an operation.

Solution to Problem

Technical Solution

The present application provides a display apparatus, wherein the display apparatus comprises a display surface for display, and the display apparatus comprises:

a touch screen, the touch screen comprising a first functional layer and a touch sensing layer which are stacked, the first functional layer being disposed on a side of the touch sensing layer facing the display surface, and the touch sensing layer receiving external touch;

a display screen, the display screen comprising a liquid crystal panel and a backlight module which are stacked, the liquid crystal panel being disposed on a side of the touch-sensitive layer facing away from the display surface, the backlight module being disposed on a side of the liquid crystal panel facing away from the display surface, a second functional layer being disposed between the liquid crystal panel and the touch sensing layer, and a third functional layer being provided between the liquid crystal panel and the backlight module; and an adhesive, the adhesive being disposed between the touch screen and the display screen and used to bond the touch screen and the display screen, wherein at least two of the first functional layer, the touch sensing layer, the adhesive, the second functional layer, and the third functional layer are provided with an anti-glare structure and/or an anti-blue light structure.

In the display apparatus recited in the present application, at least two of the first functional layer, the touch sensing layer, the adhesive, the second functional layer, and the third functional layer are provided with the anti-glare structure, and at least two of the first functional layer, the touch sensing layer, the adhesive, the second functional layer, and the third functional layer are provided with the anti-blue light structure.

In the display apparatus recited in the present application, surfaces of at least two of the first functional layer, the touch sensing layer, the second functional layer, and the third functional layer are provided with the anti-glare structure and the anti-blue light structure, or a surface of at least one of the first functional layer, the touch sensing layer, the second functional layer, and the third functional layer is provided with the anti-glare structure and the anti-blue light structure, and the adhesive is mixed with an anti-glare material and an anti-blue light material to form the anti-glare structure and the anti-blue light structure.

In the display apparatus recited in the present application, the first functional layer is a transparent cover plate, and the anti-glare structure and the anti-blue light structure are provided on a surface of the transparent cover plate facing the touch sensing layer.

In the display apparatus recited in the present application, the first functional layer is a transparent cover plate, and the anti-glare structure and the anti-blue light structure are provided on a surface of the transparent cover plate facing away from the touch sensing layer.

In the display apparatus recited in the present application, the second functional layer is an upper polarizer, and a surface of the upper polarizer facing the liquid crystal panel and/or a surface of the upper polarizer facing away from the liquid crystal panel is provided with the anti-glare structure and the anti-blue light structure.

In the display apparatus recited in the present application, the third functional layer is a lower upper polarizer, and a surface of the lower polarizer facing the backlight module and/or a surface of the lower polarizer facing away from the backlight module is provided with the anti-glare structure and the anti-blue light structure.

In the display apparatus recited in the present application, the anti-glare structure is directly formed by surface etching, or the anti-glare structure is formed by spraying or coating an anti-glare material.

In the display apparatus recited in the present application, the anti-glare structure and the anti-blue light structure are formed by spraying or coating an anti-glare material and an anti-blue light material respectively.

In the display apparatus recited in the present application, the anti-glare structure and the anti-blue light structure are formed together by spraying or coating a mixed material of an anti-glare material and an anti-blue light material.

In the display apparatus recited in the present application, the touch sensing layer is made of glass or film.

An electronic device comprising a housing and a display apparatus disposed in the housing, the display apparatus comprising a display surface for display, and the display apparatus comprising:

a touch screen, the touch screen comprising a first functional layer and a touch sensing layer which are stacked, the first functional layer being disposed on a side of the touch sensing layer facing the display surface, and the touch sensing layer receiving external touch;

a display screen, the display screen comprising a liquid crystal panel and a backlight module which are stacked, the liquid crystal panel being disposed on a side of the touch-sensitive layer facing away from the display surface, the backlight module being disposed on a side of the liquid crystal panel facing away from the display surface, a second functional layer being disposed between the liquid crystal panel and the touch sensing layer, and a third functional layer being provided between the liquid crystal panel and the backlight module; and an adhesive, the adhesive being disposed between the touch screen and the display screen and used to bond the touch screen and the display screen, In the electronic device recited in the present application, wherein at least two of the first functional layer, the touch sensing layer, the adhesive, the second functional layer, and the third functional layer are provided with an anti-glare structure and/or an anti-blue light structure.

In the electronic device recited in the present application, at least two of the first functional layer, the touch sensing layer, the adhesive, the second functional layer, and the third functional layer are provided with the anti-glare structure, and In the electronic device recited in the present application, at least two of the first functional layer, the touch sensing layer, the adhesive, the second functional layer, and the third functional layer are provided with the anti-blue light structure.

In the electronic device recited in the present application, surfaces of at least two of the first functional layer, the touch sensing layer, the second functional layer, and the third functional layer are provided with the anti-glare structure and the anti-blue light structure, or a surface of at least one of the first functional layer, the touch sensing layer, the second functional layer, and the third functional layer is provided with the anti-glare structure and the anti-blue light structure, and the adhesive is mixed with an anti-glare material and an anti-blue light material to form the anti-glare structure and the anti-blue light structure.

In the electronic device recited in the present application, the first functional layer is a transparent cover plate, and the anti-glare structure and the anti-blue light structure are provided on a surface of the transparent cover plate facing the touch sensing layer and/or the anti-glare structure and the anti-blue light structure are provided on a surface of the transparent cover plate facing away from the touch sensing layer.

In the electronic device recited in the present application, the second functional layer is an upper polarizer, and a surface of the upper polarizer facing the liquid crystal panel and/or a surface of the upper polarizer facing away from the liquid crystal panel is provided with the anti-glare structure and the anti-blue light structure.

In the electronic device recited in the present application, the third functional layer is a lower upper polarizer, and a surface of the lower polarizer facing the backlight module and/or a surface of the lower polarizer facing away from the backlight module is provided with the anti-glare structure and the anti-blue light structure.

In the electronic device recited in the present application, the anti-glare structure is directly formed by surface etching, or the anti-glare structure is formed by spraying or coating an anti-glare material.

In the electronic device recited in the present application, the anti-glare structure and the anti-blue light structure are formed by spraying or coating an anti-glare material and an anti-blue light material respectively, or the anti-glare structure and the anti-blue light structure are formed together by spraying or coating a mixed material of an anti-glare material and an anti-blue light material In the electronic device recited in the present application, the touch sensing layer is made of glass or film.

Advantageous Effects of Invention

Advantageous Effects

The beneficial effects of the present application are: the display device is arranged to comprise a first functional layer of a touch screen, a touch sensing layer of the touch screen, a second functional layer of a display screen, a liquid crystal panel of the display screen, a third functional layer of the display screen, and a backlight module of the display screen that are stacked in sequence, the touch screen and the display screen are bonded together through an adhesive disposed between the touch screen and the display screen, and at least two of the first functional layer, the touch sensing layer, the adhesive, the second functional layer, and the third functional layers are provided with an anti-glare structure and/or an anti-blue light structure, which improves anti-glare and anti-blue light functions of the display device during an operation.

BRIEF DESCRIPTION OF DRAWINGS

Description of Drawings

The technical solutions and other beneficial effects of the present application will be apparent through a detailed description of the specific embodiments of the present application in conjunction with the accompanying drawings.

Figure 1:
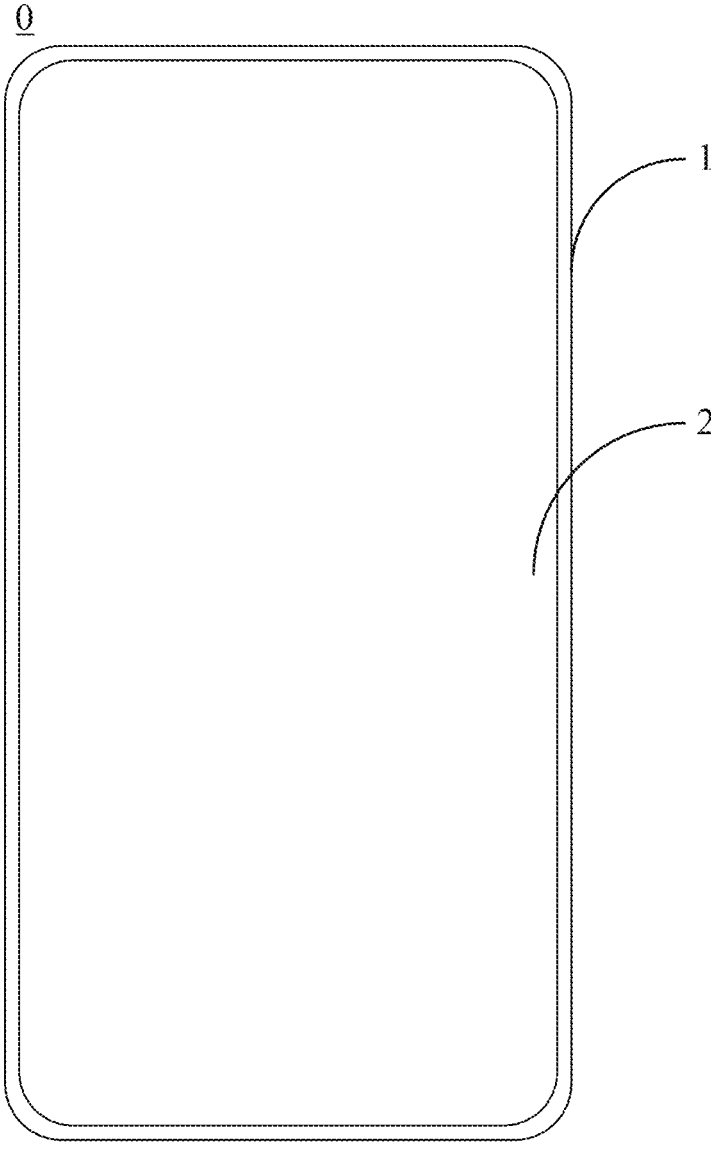

FIG. 1 is a schematic structural diagram of an electronic device provided by an embodiment of the present application.

Figure 2:
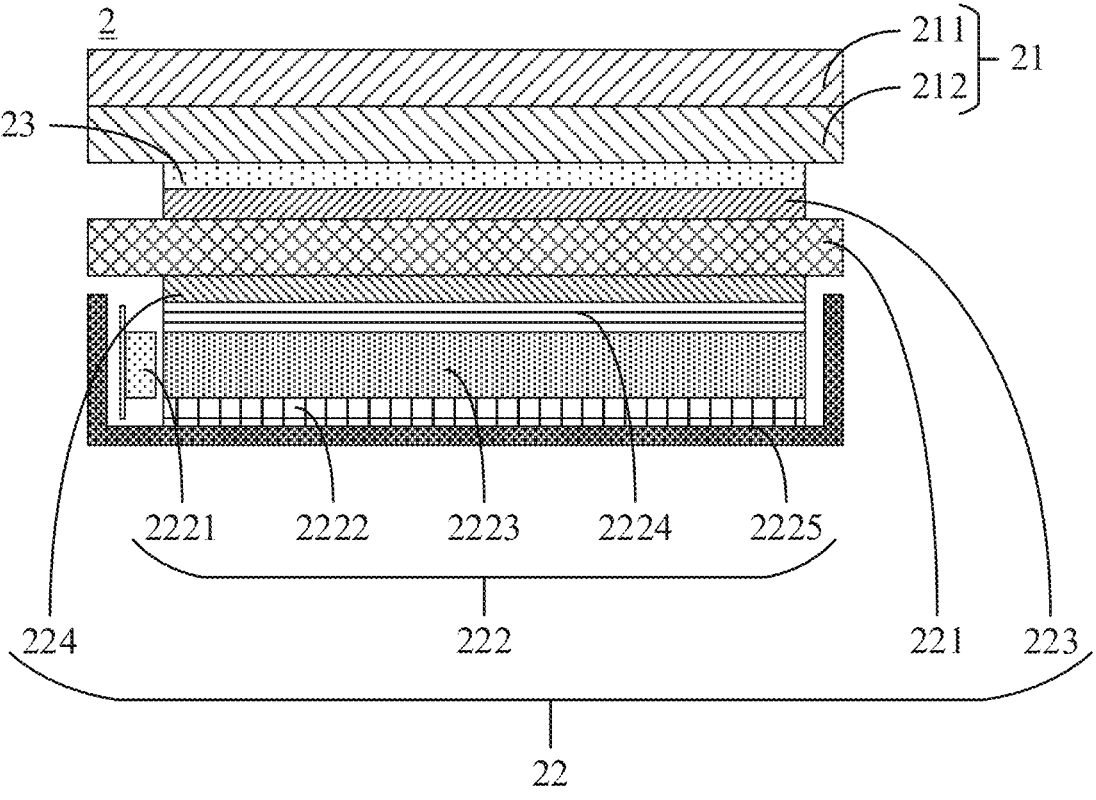

FIG. 2 is a cross-sectional view along a thickness direction of a display apparatus in the electronic device shown in FIG. 1.

Figure 3:
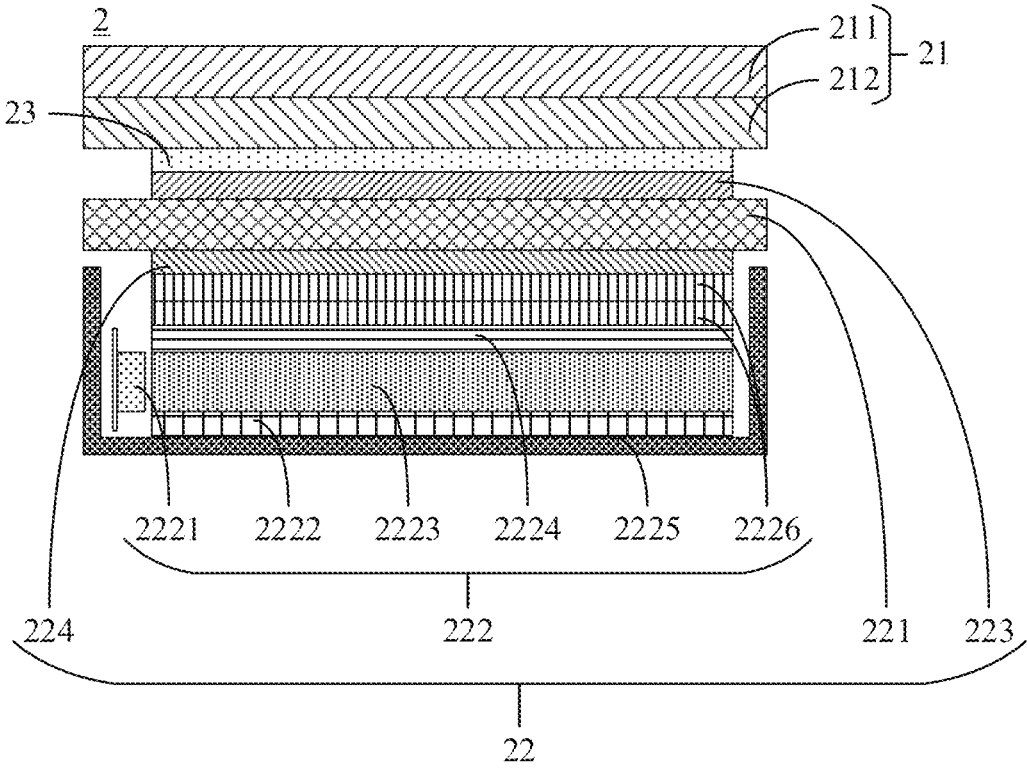

FIG. 3 is a cross-sectional view along a thickness direction of a display apparatus of an electronic device in the prior art.

INVENTIVE EMBODIMENTS

Embodiments of Invention

The technical solutions in the embodiments of the present application will be clearly and completely described below with reference to the accompanying drawings in the embodiments of the present application. Obviously, the described embodiments are merely some of the embodiments of the present application, but not all of the embodiments. Based on the embodiments in the present application, all other embodiments obtained by those skilled in the art without making creative efforts fall within the claimed scope of the present application.

Embodiments of the present application provide a display apparatus and an electronic device to improve anti-glare and anti-blue light functions of the display apparatus of the electronic device during an operation. The application will be explained with reference to the accompanying drawings in the following.

Please refer to FIGS. 1 and 2. FIG. 1 is a schematic structural diagram of an electronic device according to an embodiment of the present application. FIG. 2 is a cross-sectional view along a thickness direction of a display apparatus in the electronic device shown in FIG. 1. The electronic device 0 can be a mobile phone, a navigator, an electronic paper, a television, a digital photo frame, a tablet computer, a notebook computer, or any other product or component with a display function. The electronic device 0 may comprise a housing 1 and a display apparatus 2. The display apparatus 2 may be a liquid crystal display device such as a liquid crystal display screen, a liquid crystal display, or a liquid crystal display panel. The display apparatus 2 is installed on the housing 1 to realize the display function of the electronic device 0. In some embodiments, the display apparatus 2 is also used to implement a touch function of the electronic device 0. For example, when the electronic device 0 is a mobile terminal such as a smartphone or a tablet computer, the display apparatus 2 is used for both display and touch.

It can be understood that the structure of the electronic device 0 in the embodiment of the present application is not limited to this. The electronic device 0 may also comprise a component such as a cover, a motherboard, a battery, a camera module, a speaker, or a sensor (none of which are shown in the figures). For an introduction to components such as a cover, a mainboard, a battery, a camera module, a speaker, and a sensor, please refer to the description of the above components in related technologies, and the description is omitted here.

The housing 1 may form the outer contour of the electronic device 0. At the same time, the housing 1 can be used as a protective shell for various internal components of the electronic device 0 to prevent the various internal components of the electronic device 0 from being damaged due to collision, falling, etc. of the electronic device 0. The housing 1 can be formed in one piece. During the molding process of the housing 1, structures such as a microphone hole, a speaker hole, a receiver hole, an earphone hole, a USB interface hole, a rear camera hole, and a fingerprint recognition module installation hole can be formed on the housing 1.

The housing 1 can be a metal housing, such as magnesium alloy, stainless steel or other metals. It should be noted that the material of the housing 1 in the embodiment of the present application is not limited to this, and another material can also be used for the housing 1. For example, the housing 1 can be a plastic housing, or the housing 1 can be a ceramic housing. The housing 1 may comprise a plastic part and a metal part at the same time. The housing 1 can be a housing structure in which metal and plastic cooperate with each other. Specifically, the metal part can be formed first. For example, a magnesium alloy substrate is formed through casting. Then, plastic is injected on the magnesium alloy substrate to form a plastic substrate thereby forming a complete housing structure. It should be noted that the material and process of the housing 1 are not limited to this, and a glass housing can also be used. The embodiments of the present application do not limit the specific material and manufacturing process of the housing 1.

The display apparatus 2 may form an interactive interface of the electronic device 0. The display apparatus 2 comprises a display surface for display and a non-display surface arranged opposite to the display surface. The user can see text or images displayed by the display apparatus 2 through the display surface. The display apparatus 2 may comprise a touch screen 21 and a display screen 22. The touch screen 21 and the display screen 22 are stacked along a thickness direction of the display apparatus 2. The touch screen 21 is disposed close to the display surface of the display apparatus 2, and the display screen 22 is disposed close to the non-display surface of the display apparatus 2. An adhesive 23 is provided between the touch screen 21 and the display screen 22 for bonding the touch screen 21 with the display screen 22.

The touch screen 21 is arranged close to the display surface of the display apparatus 2 to facilitate the user to perform a touch operation on the electronic device 0 through the touch screen 21. Specifically, the touch screen 21 comprises a first functional layer 211 and a touch sensing layer 212. Wherein, the first functional layer 211 and the touch sensing layer 212 are stacked along the thickness direction of the touch screen 21, and the first functional layer 211 is located on the external surface of the touch screen 21 and the touch sensing layer 212 is located on the internal surface of the touch screen 21, so that the first functional layer 211 is disposed on the side of the touch sensing layer 212 facing the display surface of the display apparatus 2. The first functional layer 211 is located on the external surface of the touch screen 21 and used to protect the touch sensing layer 212 from being scratched or knocked into pieces during use; the touch sensing layer 212 is located on the internal surface of the touch screen 21 and used to receive external touches. operation, thereby realizing the touch function of the electronic device 0.

The display screen 22 is arranged close to the non-display surface of the display apparatus 2 to facilitate the user to observe the text or images output by the electronic device 0 through the display screen 22. Specifically, the display screen 22 comprises a liquid crystal panel 221 and a backlight module 222. Wherein, the liquid crystal panel 221 and the backlight module 222 are stacked along the thickness direction of the display screen 22, and the liquid crystal panel 221 is disposed close to the touch screen 21 of the display apparatus 2 and the backlight module 222 is disposed far away from the touch screen 21 of the display apparatus 2, so that the liquid crystal panel 221 is disposed on the side of the touch sensing layer 212 facing away from the display surface of the display apparatus 2, and the backlight module 222 is disposed on the side of the liquid crystal panel 221 facing away from the display surface of the display apparatus 2. The backlight module 222 is used to emit light to illuminate the liquid crystal panel 221, and the liquid crystal panel 221 is used to adjust and control the light emitted by the backlight module 222, thereby realizing the display function of the electronic device 0. A second functional layer 223 is disposed between the touch sensing layer 212 and the liquid crystal panel 221. A third functional layer 224 is disposed between the liquid crystal panel 221 and the backlight module 222. The third functional layer 224 is used to adjust the light that is emitted to the liquid crystal panel 221 by the backlight module 222, and the second functional layer 223 is used to adjust the light that has been adjusted and controlled by the liquid crystal panel 221, so that the display effect of the display screen 22 is better.

In some embodiments, at least two of the first functional layer 211 of the touch screen 21, the touch sensing layer 212 of the touch screen 21, the second functional layer 223 of the display screen 22, the third functional layer 224 of the display screen 22 and the adhesive 23 are equipped with an anti-glare structure and an anti-blue light structure. In other embodiments, at least two of the first functional layer 211 of the touch screen 21, the touch sensing layer 212 of the touch screen 21, the second functional layer 223 of the display screen 22, the third functional layer 224 of the display screen 22 and the adhesive 23 are equipped with an anti-glare structure or an anti-blue light structure. By equipping at least two of the first functional layer 211 of the touch screen 21, the touch sensing layer 212 of the touch screen 21, the second functional layer 223 of the display screen 22, the third functional layer 224 of the display screen 22 and the adhesive 23 with the glare structure and/or the anti-blue light structure, the anti-glare and anti-blue light functions of the display apparatus 2 of the electronic device 0 can be effectively improved during the operation. Wherein, the touch sensing layer 212 of the touch screen 21 can be made of glass, or the touch sensing layer 212 of the touch screen 21 can be made of film, or the touch sensing layer 212 of the touch screen 21 can be made of another material. The embodiment of the present application does not limit the specific material of the touch sensing layer 212.

Wherein, no less than two components are provided with the anti-glare structure, and no less than two components are provided with the anti-blue light structure. In other words, at least two of the first functional layer 211 of the touch screen 21, the touch sensing layer 212 of the touch screen 21, the second functional layer 223 of the display screen 22, the third functional layer 224 of the display screen 22 and the adhesive 23 are provided with an anti-glare structure, and at least two of the first functional layer 211 of the touch screen 21, the touch sensing layer 212 of the touch screen 21, the second functional layer 223 of the display screen 22, the third functional layer 224 of the display screen 22 and the adhesive 23 are provided with an anti-blue light structure.

Specifically, the surfaces of at least two of the first functional layer 211 of the touch screen 21, the touch sensing layer 212 of the touch screen 21, the second functional layer 223 of the display screen 22, and the third functional layer 224 of the display screen 22 are provided with an anti-glare structure and an anti-blue light structure. Alternatively, the surface of at least one of the first functional layer 211 of the touch screen 21, the touch sensing layer 212 of the touch screen 21, the second functional layer

223 of the display screen 22, and the third functional layer 224 of the display screen 22 is provided with an anti-glare structure and an anti-blue light structure, and an anti-glare material and an anti-blue light material are mixed in the adhesive 23 to form an anti-glare structure and an anti-blue light structure.

It should be noted that the surface of the touch sensing layer 212 of the touch screen 21 may be the surface of the touch sensing layer 212 facing the display screen 22 and/or the surface of the touch sensing layer 212 facing away from the display screen 22. That is, if an anti-glare structure and an anti-blue light structure are provided on the surface of the touch-sensitive layer 212 of the touch screen 21, the anti-glare structure and the anti-blue light structure can be provided only on the surface of the touch-sensitive layer 212 facing the display screen 22, or the anti-glare structure and the anti-blue light structure can be provided only on the surface of the touch-sensing layer 212 facing away from the display screen 22, or the anti-glare structure and the anti-blue light structure can be provided on the surface of the touch-sensing layer 212 facing the display screen 22 and the surface of the touch-sensing layer 212 facing away from the display screen 22.

In some embodiments, the first functional layer 211 of the touch screen 21 is a transparent cover plate. The transparent cover plate 211 and the touch-sensitive layer 212 are stacked along the thickness direction of the touch screen 21. The transparent cover plate 211 is arranged away from the display screen 22 of the display apparatus 2, and the touch sensing layer 212 is arranged close to the display screen 22 of the display apparatus 2. That is, the transparent cover plate 211 is attached to the side of the touch sensing layer 212 facing the display surface of the display apparatus 2. The transparent cover plate 211 is disposed on the external side of the touch-sensing layer 212, which can protect the touch sensing layer 212 from being scratched or stained by dust, water, oil or other stains during use. Providing an anti-glare structure and an anti-blue light structure on the surface of the transparent cover plate 211 of the touch screen 21 can further improve the anti-glare and anti-blue light functions of the display apparatus 2 of the electronic device 0 during the operation.

It should be noted that the surface of the transparent cover plate 211 of the touch screen 21 may be the surface of the transparent cover plate 211 facing the touch sensing layer 212 and/or the surface of the transparent cover plate 211 facing away from the touch sensing layer 212. That is, if an anti-glare structure and an anti-blue light structure are provided on the surface of the transparent cover plate 211 of the touch screen 21, the anti-glare structure and the anti-blue light structure can be provided only on the surface of the transparent cover plate 211 facing the touch sensing layer 212, or the anti-glare structure and the anti-blue light structure can be provided only on the surface of the transparent cover plate 211 facing away from the touch-sensing layer 212, or the anti-glare structure and the anti-blue light structure can be provided on the surface of the transparent cover plate 211 facing the touch sensing layer 212 and the surface of the transparent cover plate 211 facing away from the touch-sensing layer 212.

In some embodiments, the second functional layer 223 of the display screen 22 is an upper polarizer, and the third functional layer 224 of the display screen 22 is a lower polarizer. By providing an anti-glare structure and an anti-blue light structure on the surface of the upper polarizer 223 and/or the surface of the lower polarizer 224, the anti-glare and anti-blue light functions of the display apparatus 2 of the electronic device 0 can be improved during the operation.

It should be noted that the surface of the upper polarizer 223 may be the surface of the upper polarizer 223 facing the liquid crystal panel 221 and/or the surface of the upper polarizer 223 facing away from the liquid crystal panel 221. That is, if an anti-glare structure and an anti-blue light structure are provided on the surface of the upper polarizer 223, the anti-glare structure and the anti-blue light structure can be provided only on the surface of the upper polarizer 223 facing the liquid crystal panel 221, or the anti-glare structure and the anti-blue light structure can be provided only on the surface of the upper polarizer 223 facing away from the liquid crystal panel 221, or the anti-glare structure and the anti-blue light structure can be provided on the surface of the upper polarizer 223 facing the liquid crystal panel 221 and the surface of the upper polarizer 223 facing away from the liquid crystal panel 221.

It should be noted that the surface of the lower polarizer 224 may be the surface of the lower polarizer 224 facing the backlight module 222 and/or the surface of the lower polarizer 224 facing away from the backlight module 222. That is, if an anti-glare structure and an anti-blue light structure are provided on the surface of the lower polarizer 224, the anti-glare structure and the anti-blue light structure can be provided only on the surface of the lower polarizer 224 facing the backlight module 222, or the anti-glare structure and the anti-blue light structure can be provided only on the surface of the lower polarizer 224 facing away from the backlight module 222, or the anti-glare structure and the anti-blue light structure can be provided on the surface of the lower polarizer 224 facing the backlight module 222 and the surface of the lower polarizer 224 facing away from the backlight module 222.

Wherein, an anti-glare structure can be directly formed by surface etching, or an anti-glare structure can be formed by spraying or coating an anti-glare material. An anti-glare material and an anti-blue light material can be sprayed or coated separately to form an anti-glare structure and an anti-blue light structure respectively. Alternatively, an anti-glare material and an anti-blue light material can be mixed and then sprayed or coated together to form an anti-glare structure and an anti-blue light structure at the same time. The embodiments of the present application do not limit the specific manner in which an anti-glare structure and an anti-blue light structure are formed.

Please refer to FIGS. 2 and 3. FIG. 3 is a cross-sectional view along a thickness direction of a display apparatus of an electronic device in the prior art. The backlight module 222 of the display screen 22 generally comprises a light bar 2221, a reflective sheet 2222, a light guide plate 2223, a diffusion sheet 2224, a back plate 2225 and a light enhancement sheet 2226. The back plate 2225 has a receiving space, and the light bar 2221, the reflective sheet 2222, the light guide plate 2223, the diffusion sheet 2224, and the light-enhancing sheet 2226 are all arranged in the receiving space of the back plate 2225.

The light-enhancing sheet 2226, the diffusion sheet 2224, the light guide plate 2223, and the reflective sheet 2222 are stacked along the thickness direction of the backlight module 222, and the light-enhancing sheet 2226 is disposed close to the display surface of the display device 2 and the reflective sheet 2222 is disposed close to the non-display surface of the display device 2; the light bar 2221 and the light guide plate 2223 are arranged oppositely along the length direction or width direction of the backlight module 222, so that the light guide plate 2223 and the reflective sheet

2222 cooperate to transmit the light emitted by the light bar 2221 from one side of the light guide plate 2223 to the other side of the light guide plate 2223.

Different from the display apparatus of the electronic device in the prior art, the display apparatus 2 of the electronic device 0 provided by the embodiment of the present application does not dispose any layer of the light-enhancing sheet 2226 in the backlight module 222 of the display screen 22, so that the backlight module 222 only comprises a light bar 2221, a reflective sheet 2222, a light guide plate 2223, a diffusion sheet 2224, and a back plate 2225. By removing the upper and lower light-enhancing sheets 2226 in the backlight module 222 of the display screen 22, the effect of reducing light concentration can be achieved, thereby further improving the anti-glare function of the display apparatus 2 of the electronic device 0 during the operation.

For the introduction of the liquid crystal panel 221 of the display screen 22, please refer to the description of the liquid crystal panels in the related art, and will not be described again here.

It should be noted that in all the above embodiments, the arrangement of the anti-glare structure and the anti-blue light structure can be adjusted according to actual requirements. For example, only an anti-glare structure can be provided without any anti-blue light structure, or only an anti-blue light structure can be provided without any anti-glare structure, or both an anti-glare structure and an anti-blue light structure can be provided at the same time. The embodiments of the present application do not limit this arrangement.

It should also be noted that the embodiments and drawings of the present application take the backlight module 222 of the display screen 22 in the display apparatus 2 as an edge-type backlight module for an example to illustrate the display apparatus 2, however, the technical solution of the present application is equally applicable to a direct-lit backlight modules.

In the above embodiments, the description of each embodiment has its own emphasis. For parts that are not described in detail in a certain embodiment, please refer to the relevant descriptions of the other embodiments.

The display apparatus and the electronic device provided by the embodiments of the present application have been introduced in detail above. This article uses specific examples to illustrate the principles and implementation manners of the present application. The description of the above embodiments is only used to help understand the methods and core idea of the present application; for those skilled in the art, there will be changes in the specific implementation and application scope based on the idea of the present application. In summary, the content of this description should not be understood as a limitation of the present application.

The invention claimed is:

1. A display apparatus, wherein the display apparatus comprises a display surface for display, and the display apparatus comprises:

a touch screen, the touch screen comprising a first functional layer and a touch sensing layer which are stacked, the first functional layer being disposed on a side of the touch sensing layer facing the display surface, and the touch sensing layer receiving external touch;

a display screen, the display screen comprising a liquid crystal panel and a backlight module which are stacked, the liquid crystal panel being disposed on a side of the touch sensing layer facing away from the display surface, the backlight module being disposed on a side of the liquid crystal panel facing away from the display surface, a second functional layer being disposed between the liquid crystal panel and the touch sensing layer, and a third functional layer being provided between the liquid crystal panel and the backlight module; and an adhesive, the adhesive being disposed between the touch screen and the display screen and used to bond the touch screen and the display screen, wherein at least two of the first functional layer, the touch sensing layer, the adhesive, the second functional layer, and the third functional layer are provided with an anti-glare structure and an anti-blue light structure.

2. The display apparatus according to claim 1, wherein, the first functional layer is a transparent cover plate, and the anti-glare structure and the anti-blue light structure are provided on a surface of the transparent cover plate facing the touch sensing layer.

3. The display apparatus according to claim 2, wherein, the anti-glare structure is directly formed by surface etching, or the anti-glare structure is formed by spraying or coating an anti-glare material.

4. The display apparatus according to claim 3, wherein, the anti-glare structure and the anti-blue light structure are formed by spraying or coating an anti-glare material and an anti-blue light material respectively.

5. The display apparatus according to claim 3, wherein, the anti-glare structure and the anti-blue light structure are formed together by spraying or coating a mixed material of an anti-glare material and an anti-blue light material.

6. The display apparatus according to claim 1, wherein, the first functional layer is a transparent cover plate, and the anti-glare structure and the anti-blue light structure are provided on a surface of the transparent cover plate facing away from the touch sensing layer.

7. The display apparatus according to claim 1, wherein, the second functional layer is an upper polarizer, and a surface of the upper polarizer facing the liquid crystal panel and a surface of the upper polarizer facing away from the liquid crystal panel are provided with the anti-glare structure and the anti-blue light structure.

8. The display apparatus according to claim 1, wherein, the third functional layer is a lower upper polarizer, and a surface of the lower polarizer facing the backlight module and a surface of the lower polarizer facing away from the backlight module are provided with the anti-glare structure and the anti-blue light structure.

9. The display apparatus according to claim 1, wherein, the touch sensing layer is made of glass or film.

10. An electronic device comprising a housing and a display apparatus disposed in the housing, the display apparatus comprising a display surface for display, and the display apparatus comprising:

a touch screen, the touch screen comprising a first functional layer and a touch sensing layer which are stacked, the first functional layer being disposed on a side of the touch sensing layer facing the display surface, and the touch sensing layer receiving external touch;

a display screen, the display screen comprising a liquid crystal panel and a backlight module which are stacked, the liquid crystal panel being disposed on a side of the touch sensing layer facing away from the display surface, the backlight module being disposed on a side of the liquid crystal panel facing away from the display surface, a second functional layer being disposed between the liquid crystal panel and the touch sensing layer, and a third functional layer being provided between the liquid crystal panel and the backlight module; and an adhesive, the adhesive being disposed between the touch screen and the display screen and used to bond the touch screen and the display screen, wherein at least two of the first functional layer, the touch sensing layer, the adhesive, the second functional layer, and the third functional layer are provided with an anti-glare structure and/or and an anti-blue light structure.

11. The electronic device according to claim 10, wherein, the first functional layer is a transparent cover plate, and the anti-glare structure and the anti-blue light structure are provided on a surface of the transparent cover plate facing the touch sensing layer and/or and the anti-glare structure and the anti-blue light structure are provided on a surface of the transparent cover plate facing away from the touch sensing layer.

12. The electronic device according to claim 11, wherein, the anti-glare structure is directly formed by surface etching, or the anti-glare structure is formed by spraying or coating an anti-glare material.

13. The electronic device according to claim 12, wherein, the anti-glare structure and the anti-blue light structure are formed by spraying or coating an anti-glare material and an anti-blue light material respectively, or the anti-glare structure and the anti-blue light structure are formed together by spraying or coating a mixed material of an anti-glare material and an anti-blue light material.

14. The electronic device according to claim 10, wherein, the second functional layer is an upper polarizer, and a surface of the upper polarizer facing the liquid crystal panel and a surface of the upper polarizer facing away from the liquid crystal panel are provided with the anti-glare structure and the anti-blue light structure.

15. The electronic device according to claim 10, wherein, the third functional layer is a lower upper polarizer, and a surface of the lower polarizer facing the backlight module and a surface of the lower polarizer facing away from the backlight module are provided with the anti-glare structure and the anti-blue light structure.

16. The electronic device according to claim 10, wherein, the touch sensing layer is made of glass or film.

* * * * *